Patented May 8, 1923.

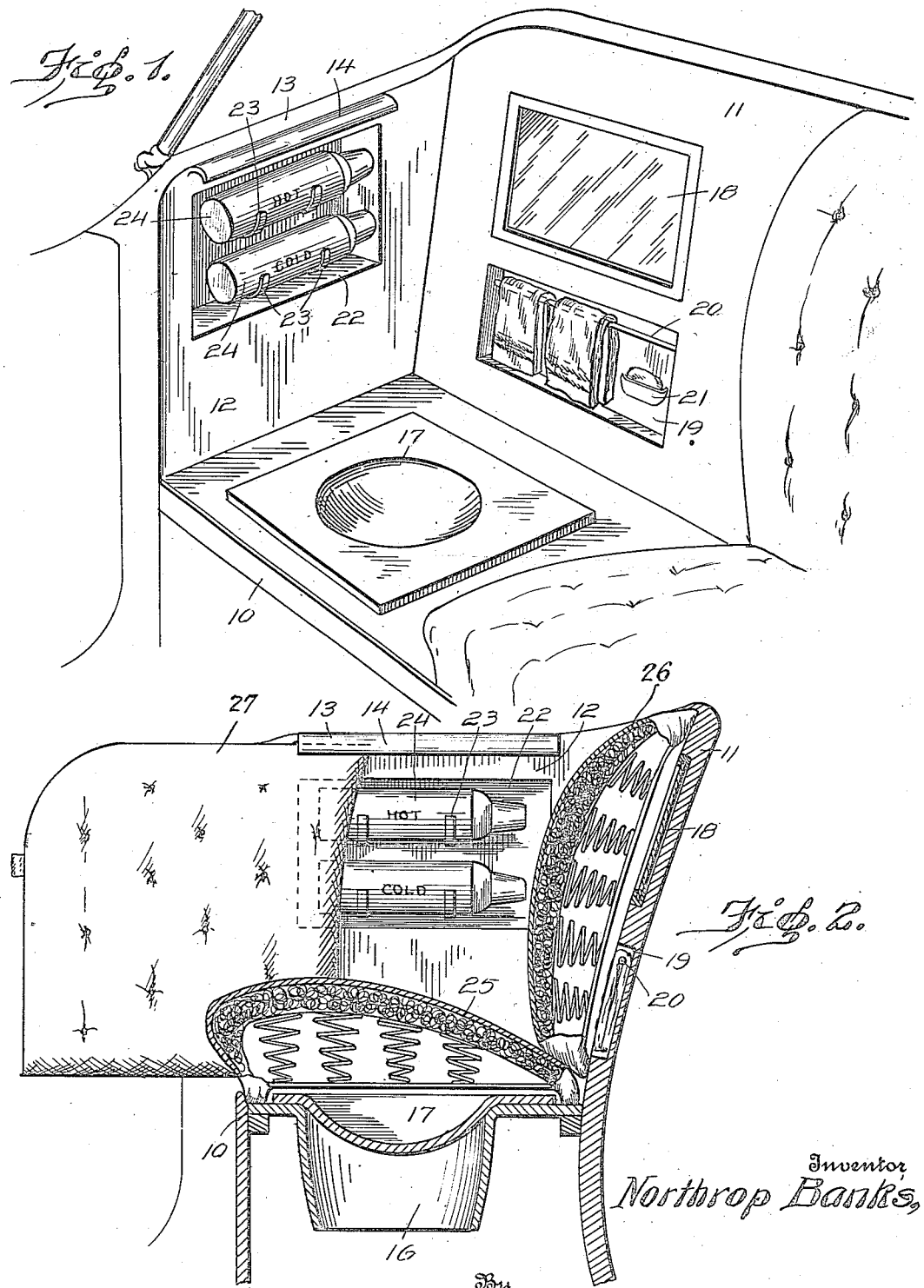

1,454,618

UNITED STATES PATENT OFFICE.

NORTHROP BANKS, OF LAMAR, MISSOURI.

TOILET ATTACHMENT FOR AUTOMOBILES.

Application filed August 30, 1921. Serial No. 496,832.

*To all whom it may concern:*

Be it known that I, NORTHROP BANKS, a citizen of the United States, residing at Lamar, in the county of Barton and State of Missouri, have invented certain new and useful Improvements in Toilet Attachments for Automobiles, of which the following is a specification.

This invention relates to passenger vehicles, more particularly to motor driven vehicles of the automobile class, and has for one of its objects to provide a combined commode and lavatory device in one of the seats, covered and closed by the cushion members, and cavities or pockets in one or both ends and the back of the seat, also covered and closed by the end and back cushions.

Another object of the invention is to provide a device of this character in which a device is produced whereby the various openings and cavities are entirely concealed by the cushions, and in which the presence of the attachments does not change the appearance or efficiency of the seat or its ends or back.

With these and other objects in view the invention consists in certain novel features of construction as hereinafter shown and described and then specifically pointed out in the claim, and in the drawings illustrative of the preferred embodiment of the invention:—

Figure 1 is a perspective view of a portion of the seat of a vehicle with portions of the cushions removed and the improvements applied.

Figure 2 is a transverse section of the parts shown in Fig. 1 together with the cushions in place.

The improved devices are designed to be installed in the seat, preferably the rear seat, of an automobile or like vehicle, the base of the seat being indicated at 10, the body of the back at 11, and the body of one of the ends at 12.

The arm rest of the seat end is represented at 13, and extending inwardly from the arm rest is a guide rib 14 which overhangs the inner face of the member 12.

Formed in the seat base 10 is an opening from which a commode device represented conventionally at 16, depends, as shown in Fig. 2.

A lavatory basin represented at 17 bears upon the seat base and depends into the commode as shown.

Embedded in the seat back 11 is a mirror represented at 18, and also formed in the seat back is a cavity 19 for a towel rack 20 and soap dish 21 or other article.

Formed in the body 12 of the seat end is a recess or cavity 22 having hangers 23 to support thermos bottles 24 or other articles.

A seat cushion, represented at 25, when in position on the seat base 11, constitutes a closure and cover for the lavatory and commode, while a back seat cushion, represented at 26, forms a closure and cover for the mirror 18 and the cavity or recess 19.

A third cushion 27 is arranged to slide beneath the guide member 14 as shown in Fig. 2, and thus forms a cover and closure for the recess or cavity 22, and its contents.

The various cushions when in place entirely conceal the openings and the recesses, and present the ordinary appearance of an automobile seat, the presence of the recesses in no way interfering with the usual operation of the cushions.

By this simple arrangement a structure is provided whereby an automobile is equipped with toilet facilities for the comfort and convenience of the occupants while travelling and which does not in any manner detract from the appearance of the vehicle.

Having thus described the invention, what is claimed as new is:—

A vehicle seat comprising a base portion, a back portion and end portions, the end portions having inwardly directed guide ribs at their upper edges and recesses in their confronting faces, cushion elements slidably engaging the guide ribs, and a seat cushion element bearing at its ends against the end cushion elements and holding them from lateral displacement.

In testimony whereof, I affix my signature hereto.

NORTHROP BANKS.